(12) United States Patent
Hagiwara (10) Patent No.: US 9,996,146 B2
(45) Date of Patent: Jun. 12, 2018

(54) INFORMATION PROCESSING APPARATUS

(71) Applicant: CANON KABUSHIKI KAISHA, Tokyo (JP)

(72) Inventor: Yuichi Hagiwara, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 45 days.

(21) Appl. No.: 15/074,862

(22) Filed: Mar. 18, 2016

(65) Prior Publication Data

US 2016/0282931 A1   Sep. 29, 2016

(30) Foreign Application Priority Data

Mar. 24, 2015  (JP) .................................. 2015-061689

(51) Int. Cl.
| | |
|---|---|
| *G06F 1/26* | (2006.01) |
| *G06F 1/28* | (2006.01) |
| *G06F 1/30* | (2006.01) |
| *G06F 1/32* | (2006.01) |
| *G06F 13/42* | (2006.01) |

(Continued)

(52) U.S. Cl.
CPC .............. *G06F 1/3296* (2013.01); *G06F 1/26* (2013.01); *G06F 1/266* (2013.01); *G06F 1/28* (2013.01); *G06F 1/30* (2013.01); *G06F 3/12* (2013.01); *G06F 13/4221* (2013.01); *H04N 1/00* (2013.01); *Y02B 60/1228* (2013.01); *Y02B 60/1235* (2013.01)

(58) Field of Classification Search
CPC ................ G06F 1/26; G06F 1/28; G06F 1/30
See application file for complete search history.

(56) References Cited

U.S. PATENT DOCUMENTS

| | | | |
|---|---|---|---|
| 2005/0110471 A1* | 5/2005 | Mayega ................ | H02M 3/156 323/267 |
| 2009/0021219 A1* | 1/2009 | Yoda ..................... | H02J 7/025 320/137 |

(Continued)

FOREIGN PATENT DOCUMENTS

JP      2003-274641 A      9/2003

OTHER PUBLICATIONS

Operational Amplifier, Dec. 24, 2014. https://en.wikipedia.org/w/index.php?title=Operational_amplifier&oldid=639420957.*

*Primary Examiner* — Kim Huynh
*Assistant Examiner* — Kevin Stewart
(74) *Attorney, Agent, or Firm* — Canon U.S.A., Inc. IP Division (57) ABSTRACT

The present invention relates to an information processing apparatus including a power supply part and a voltage compensating circuit. The power supply part is configured to supply electric power to a first electronic device and a second electronic device. The voltage compensating circuit is configured, when the first electronic device is connected to the information processing apparatus, to increase a voltage output from the power supply part and to switch a power supply path for supplying the output voltage to the second electronic device from a first power supply path to a second power supply path including a step-down element so as to decrease the increased output voltage and to supply the decreased output voltage to the second electronic device.

11 Claims, 5 Drawing Sheets (51) Int. Cl.
*G06F 3/12* (2006.01)
*H04N 1/00* (2006.01)

(56) References Cited

U.S. PATENT DOCUMENTS

| | | | | |
|---|---|---|---|---|
| 2009/0164670 A1* | 6/2009 | Nakano | ................ | G06K 15/00 |
| | | | | 710/18 |
| 2012/0065807 A1* | 3/2012 | Yokota | ................ | H02H 3/325 |
| | | | | 700/298 |
| 2013/0009470 A1* | 1/2013 | Chuang | ................ | H02J 7/0065 |
| | | | | 307/31 |
| 2013/0132758 A1* | 5/2013 | Shiba | ................ | G06F 1/28 |
| | | | | 713/340 |
| 2014/0359311 A1* | 12/2014 | Jahagirdar | ................ | G06F 1/26 |
| | | | | 713/300 |
| 2015/0100812 A1* | 4/2015 | Jing | ................ | G06F 1/266 |
| | | | | 713/340 |
| 2015/0333514 A1* | 11/2015 | Wang | ................ | H02J 1/14 |
| | | | | 307/103 |
| 2016/0054786 A1* | 2/2016 | Chenault | ................ | G06F 1/3212 |
| | | | | 710/313 |

\* cited by examiner

INFORMATION PROCESSING APPARATUS

BACKGROUND OF THE INVENTION

Field of the Invention

The present invention relates to an information processing apparatus capable of supplying electric power from a power supply part to a plurality of electronic devices.

Description of the Related Art

To supply electric power generated by a power supply part to electronic devices, the power supply part needs to allow for a voltage drop in a cable connecting the power supply part and the electronic devices. For example, voltage to be supplied to a universal serial bus (USB) interface circuit (an electronic device) is standardized within 5 V±5% (4.75 V to 5.25 V). Therefore, the voltage output from the power supply part is to be higher than 5 V in consideration of the voltage drop in a cable between the power supply part and the USB interface circuit.

Japanese Patent Laid-Open No. 2003-274641 discloses a power supply unit that adjusts voltage output from a DC-to-DC converter (a power supply part) in consideration of a voltage drop in a cable connecting the DC-to-DC converter and an electronic device. The power supply unit disclosed in Japanese Patent Laid-Open No. 2003-274641 is provided with a current sensor that detects a current flowing through the cable. When the current sensor detects a current, an output-power control unit adjusts the voltage output from the DC-to-DC converter.

Although Japanese Patent Laid-Open No. 2003-274641 discloses an example in which the voltage output from the power supply part is supplied to a single electronic device, the voltage output from the power supply part is supplied to a plurality of electronic devices in some cases. However, when the voltage output from the power supply part is increased for a particular electronic device in consideration of a voltage drop in the cable, as in Japanese Patent Laid-Open No. 2003-274641, voltages to be supplied to the other electronic devices will be increased.

SUMMARY OF THE INVENTION

The present invention provides an information processing apparatus including a power supply part and a voltage compensating circuit. The power supply part is configured to supply electric power to a first electronic device and a second electronic device. The voltage compensating circuit is configured, when the first electronic device is connected to the information processing apparatus, to increase a voltage output from the power supply part and to switch a power supply path for supplying the output voltage to the second electronic device from a first power supply path to a second power supply path including a step-down element so as to decrease the increased output voltage and to supply the decreased output voltage to the second electronic device.

Further features of the present invention will become apparent from the following description of exemplary embodiments with reference to the attached drawings.

DESCRIPTION OF THE EMBODIMENTS

Embodiments of the present invention will be described hereinbelow with reference to the drawings.

First Embodiment

Figure 1:
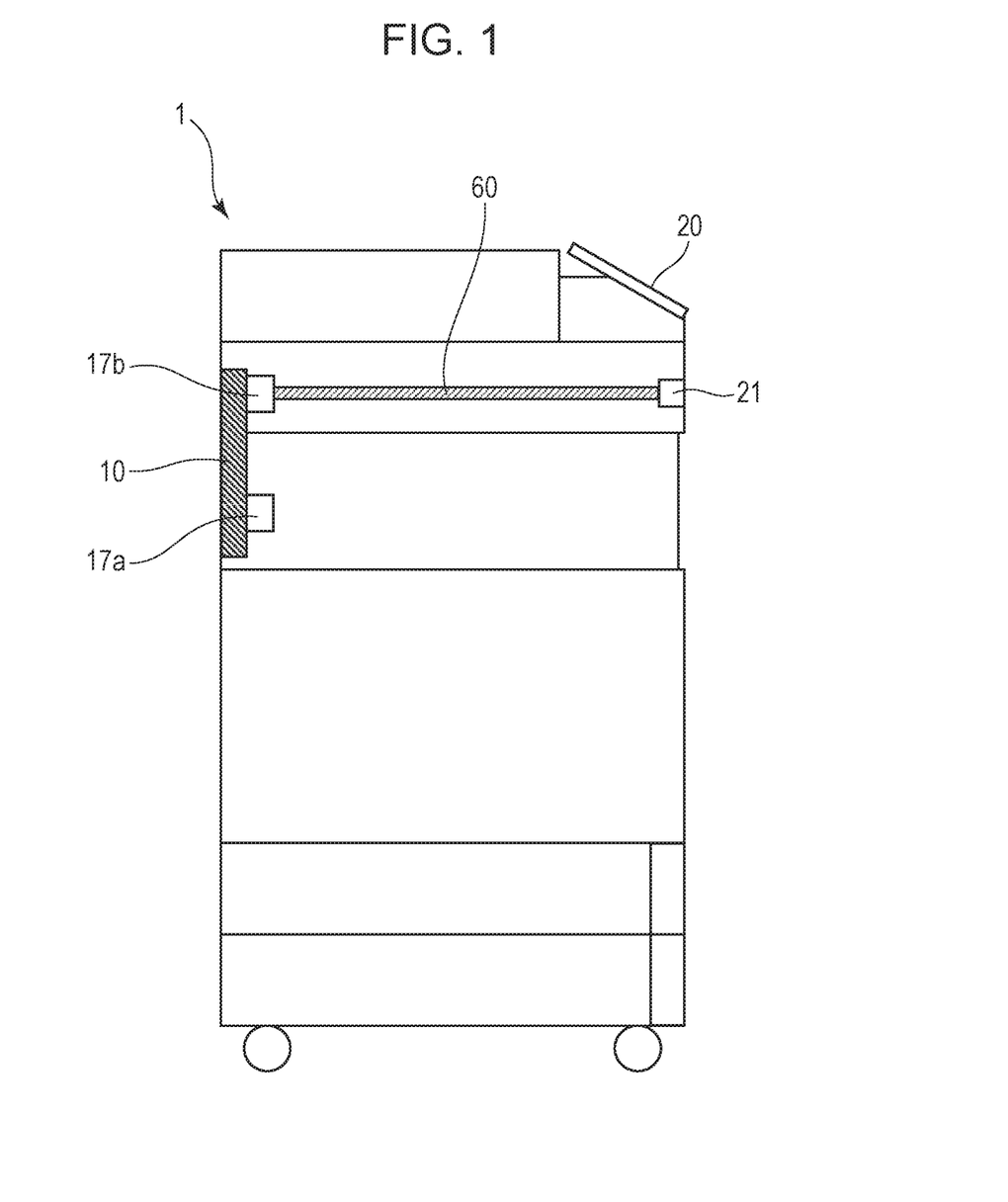
FIG. 1 is a side view of an image forming apparatus according to an embodiment of the present invention.

FIG. 1 is a side view of an image forming apparatus 1.

As shown in FIG. 1, the image forming apparatus 1 includes a plurality of USB interfaces for connecting a plurality of USB devices. A back USB interface 17a is provided at the back of the image forming apparatus 1. A front USB interface 21 is provided at the front of the image forming apparatus 1. USB devices that are attached and detached with high frequency are generally connected to the front USB interface 21 for use. USB devices that are attached and detached with low frequency, such as a backup storage, are generally connected to the back USB interface 17a for use.

A controller unit 10 for controlling the image forming apparatus 1 is disposed at the back of the image forming apparatus 1. The controller unit 10 includes the back USB interface 17a in which a connecting end for a USB device is exposed from the casing of the image forming apparatus 1. The controller unit 10 further includes an internal USB interface 17b. The internal USB interface 17b connects to one end of a USB cable 60, and the front USB interface 21 connects to the other end of the USB cable 60.

Although the USB cable 60 of this embodiment is routed in the casing of the image forming apparatus 1, the USB cable 60 may be out of the casing of the image forming apparatus 1.

Figure 2:
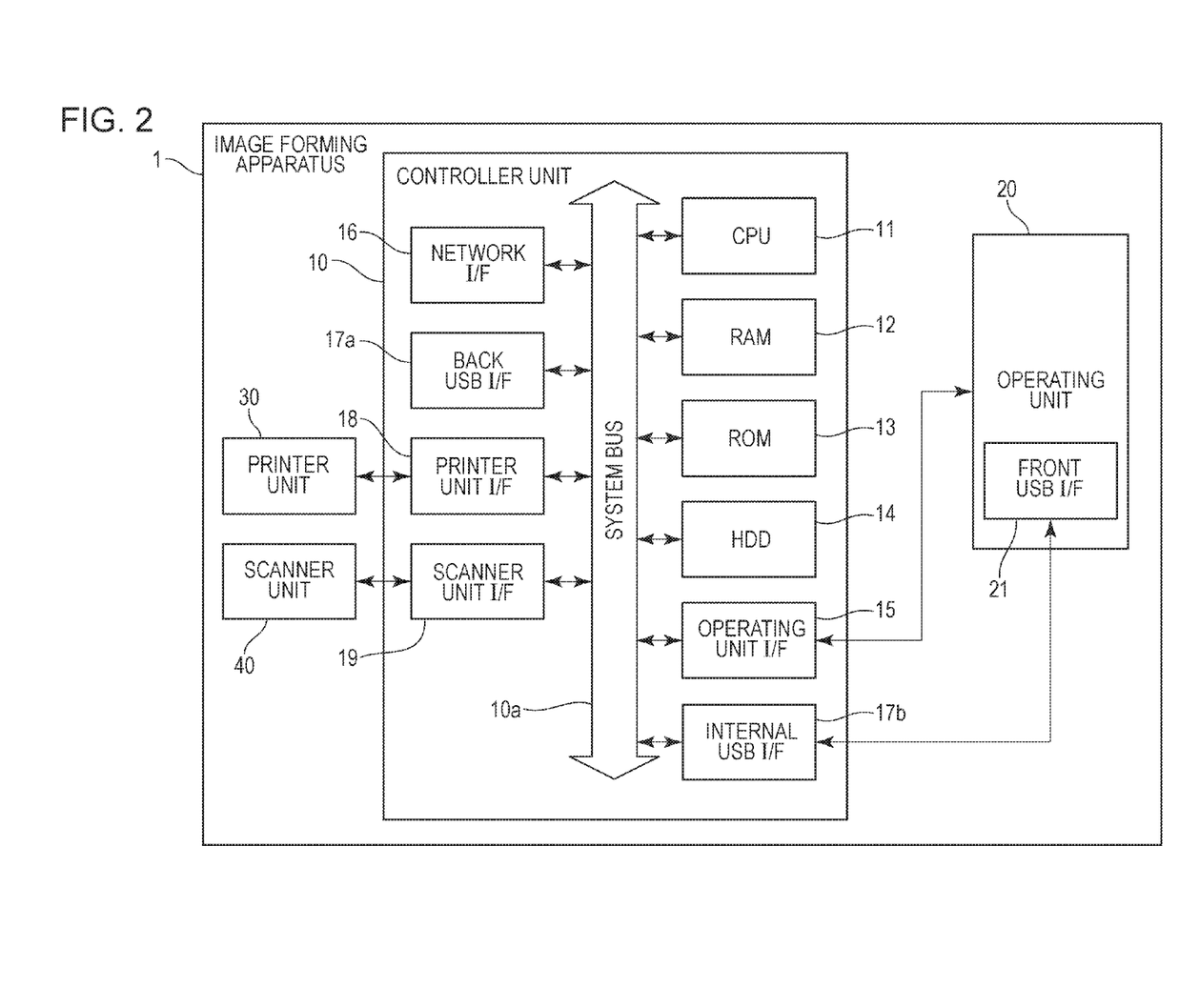
FIG. 2 is a block diagram of the image forming apparatus.

FIG. 2 is a block diagram of the image forming apparatus 1. As shown in FIG. 2, the image forming apparatus 1 includes the controller unit 10, an operating unit 20, a printer unit 30, and a scanner unit 40.

The controller unit 10 controls the operating unit 20, the printer unit 30, and the scanner unit 40 connected to the controller unit 10. The printer unit 30 outputs a digital image to a sheet. The scanner unit 40 optically reads an image from an original and converts the image to a digital image.

The operating unit 20 includes various buttons operated by the user and a display unit. In this embodiment, the operating unit 20 includes the front USB interface (hereinafter referred to as "front USB I/F") 21 to which a USB device is to be connected.

Next, the details of the controller unit 10 will be described.

The controller unit 10 includes a CPU 11, a RAM 12, a ROM 13, and a hard disk drive (HDD) 14. The controller unit 10 further includes an operating unit interface (an operating unit I/F) 15 and a network interface (hereinafter referred to as "NIC") 16. The controller unit 10 further includes the internal USB interface (hereinafter referred to as "internal USB I/F") 17b and the back USB interface (hereinafter referred to as "back USB I/F") 17a. The controller unit 10 further includes a printer unit interface (hereinafter referred to as "printer unit I/F") 18 and a scanner unit interface (hereinafter referred to as "scanner unit I/F")

19. The components of the controller unit 10 are mounted on one or a plurality of substrates.

The CPU 11 executes various data processing operations on the basis of programs. The CPU 11 controls the various devices connected to a system bus 10a in an integrated way. The RAM 12 is a main memory for running the CPU 11, such as a DRAM. The ROM 13 stores a system boot program and so on. The HDD 14 is a secondary storage, in which an operating system and a print job received via the NIC 16 are stored.

The CPU 11 of this embodiment has the function of a USB controller. The CPU 11 controls transmission and reception of data via the back USB I/F 17a and the front USB I/F 21 and supply of bus power to the back USB I/F 17a and the front USB I/F 21. Although this embodiment has been described as applied to an example in which the CPU 11 has the function of a USB controller, a chip different from the CPU 11 may control the transmission and reception of data via the USB I/Fs 17a and 21 and supply of bus power to the USB I/Fs 17a and 21.

The NIC 16 is an interface for communicating with an external device via a local area network (LAN) or the like. The printer unit I/F 18 is an interface for communicating with the printer unit 30. The scanner unit I/F 19 is an interface for communicating with the scanner unit 40. The operating unit I/F 15 is an interface for communicating with the operating unit 20.

The internal USB I/F 17b is an interface for communicating with the front USB I/F 21 and connects to one end of the USB cable 60. The back USB I/F 17a is an interface for communicating with a USB device connected. The back USB I/F 17a is connected to a hard disk or a USB memory for storing backup data.

Power Supply Unit

Figure 3:
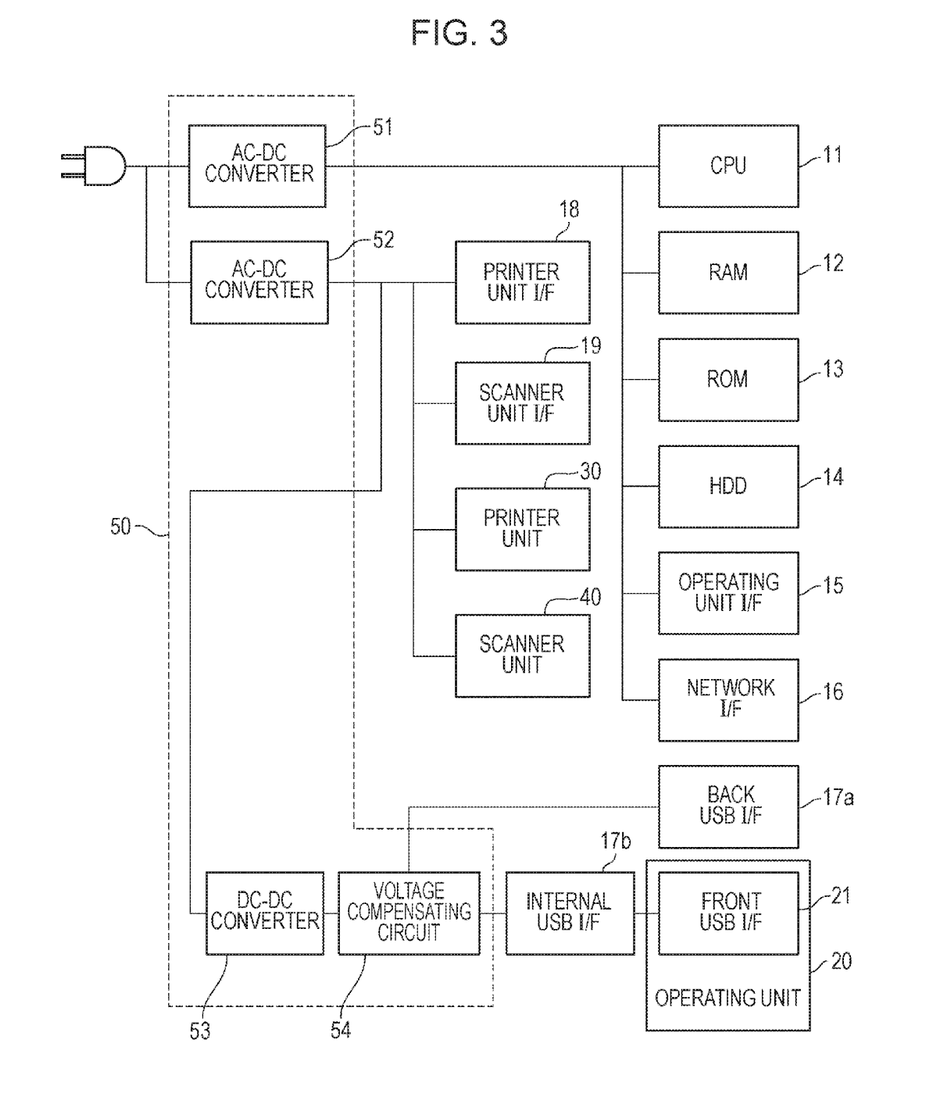
FIG. 3 is a block diagram illustrating a power supply unit of the image forming apparatus.

FIG. 3 is a block diagram illustrating a power supply unit 50 of the image forming apparatus 1.

The power supply unit 50 is a unit for supplying electric power to the components of the image forming apparatus 1. The power supply unit 50 includes an AC-to-DC converter 51, an AC-to-DC converter 52, a DC-to-DC converter (a power supply part) 53, and a voltage compensating circuit 54.

The AC-to-DC converter 51 generates a direct-current voltage (for example, 5.0 V) from an alternating-current voltage and supplies the electric power to the CPU 11, the ROM 13, the RAM 12, the HDD 14, the operating unit I/F 15, the NIC 16, the printer unit I/F 18, and the scanner unit I/F 19.

The AC-to-DC converter 52 generates a direct-current voltage (for example, 12.0 V and 24.0 V) from an alternating-current voltage and supplies the electric power to the printer unit 30 and the scanner unit 40.

The DC-to-DC converter 53 is a switching DC-to-DC converter. The DC-to-DC converter 53 decreases the direct-current voltage generated by the AC-to-DC converter 52 to generate a direct-current voltage (for example, 5.0 V). The direct-current voltage generated by the DC-to-DC converter 53 is supplied to the back USB I/F 17a, the internal USB I/F 17b, and the front USB I/F 21. The DC-to-DC converter 53 is configured to be fed back a predetermined voltage (for example, 0.8 V). When the fed back voltage is higher than a predetermined voltage (for example, 0.8 V), the DC-to-DC converter 53 control the output voltage to be decreased. When the fed back voltage is lower than the predetermined voltage, the DC-to-DC converter 53 control the output voltage to be increased.

The voltage compensating circuit 54 adjusts the output voltage so that a USB device connected to the back USB I/F 17a and a USB device connected to the front USB I/F 21 are supplied with voltages in a predetermined range.

Voltage Compensating Circuit

Figure 4:
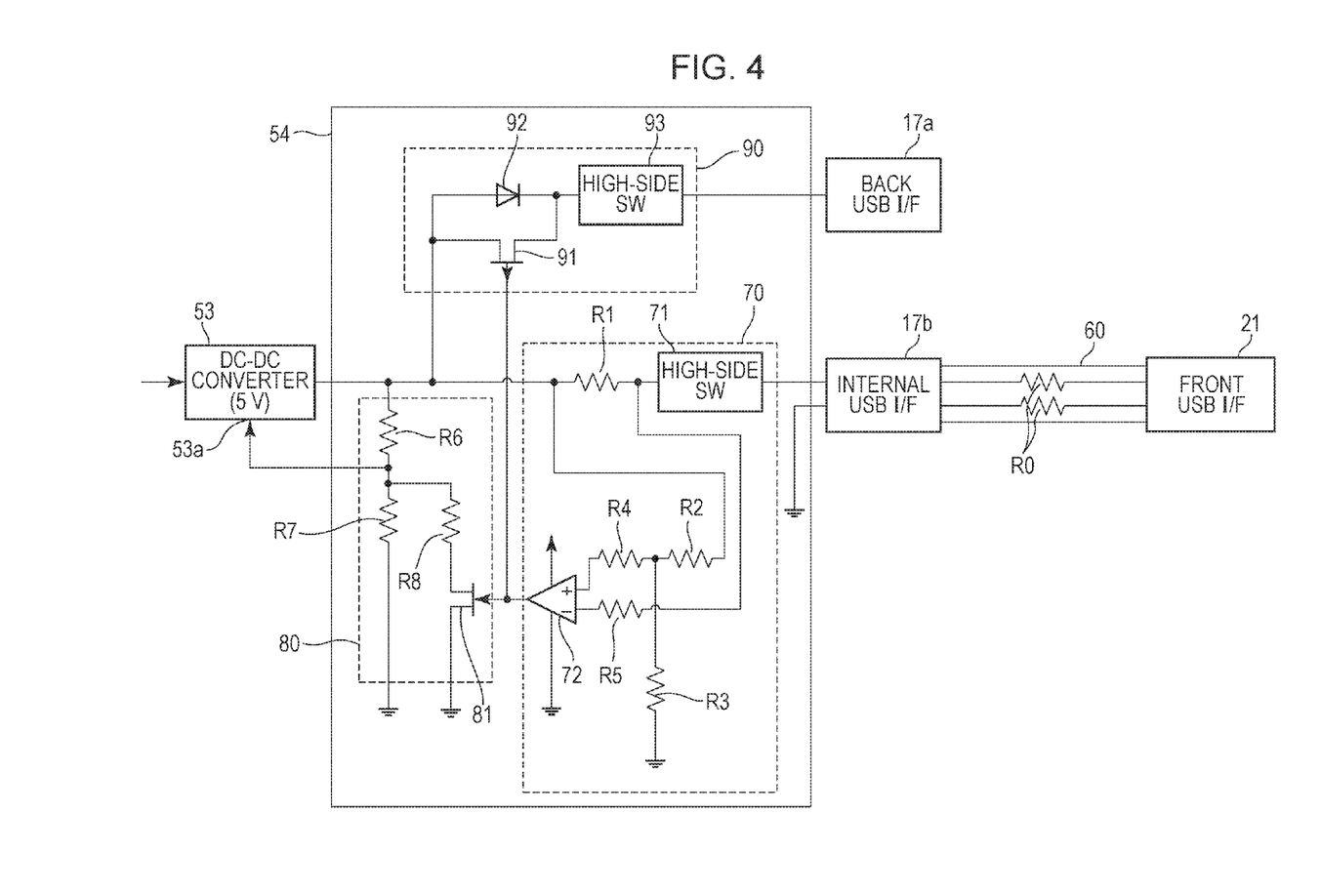
FIG. 4 is a circuit diagram illustrating a voltage compensating circuit according to a first embodiment of the present invention.

FIG. 4 is a circuit diagram illustrating the voltage compensating circuit 54.

As shown in FIG. 4, the voltage compensating circuit 54 includes a current detection circuit 70, a voltage control circuit 80, and a switching circuit 90. The voltage adjusted by the voltage compensating circuit 54 is supplied to the front USB I/F 21 through the USB cable 60. The USB cable 60 includes two data lines and two power supply lines (a V-BUS and a GND). Because the two power supply lines each have a resistor R0, voltage drops in the resistors R0 of the two power supply lines have to be taken into account for the voltage supplied to the front USB I/F 21. The USB cable 60 is connected to a substrate on which the components of the controller unit 10 are mounted.

The current detection circuit 70 is a circuit for detecting that a current with a predetermined value or higher flows through the front USB I/F 21. The current detection circuit 70 includes a high-side switch 71, resistors R1 to R5, and a comparator 72. The high-side switch 71 controls ON/OFF of the V-BUS according to an instruction from the CPU 11. In addition to the ON/OFF of the V-BUS, the high-side switch 71 further has the function of overcurrent protection for forcedly turning off the V-BUS when a current with a predetermined value or higher flows.

The comparator 72 compares a voltage input to a plus terminal (an input terminal) and a voltage input to a minus terminal (an input terminal), and if the input voltage of the plus terminal is higher than the input voltage of the minus terminal, the comparator 72 outputs High, and if lower, the comparator 72 outputs Low. When a USB device is connected to the front USB I/F 21, and a current flows through the resistor R1, the voltage at the plus terminal of the comparator 72 becomes higher than that at the minus terminal because of a voltage drop at the resistor R1. Thus, the comparator 72 outputs High. The resistor R1 is disposed between the DC-to-DC converter 53 and the front USB I/F 21. The plus terminal of the comparator 72 is connected one end of the resistor R1, and the minus terminal is connected to the other end of the resistor R1.

The resistors R2 and R3 are dividing resistors disposed so that the voltage at the plus terminal of the comparator 72 becomes lower than the voltage at the minus terminal when a predetermined current does not flow through the resistor R1. The resistors R4 and R5 are denoising resistors for preventing the comparator 72 from malfunctioning due to ripples generated in voltage output from the DC-to-DC converter 53.

The voltage control circuit 80 is a circuit for controlling the voltage output from the DC-to-DC converter 53. The output of the voltage control circuit 80 is input to a feedback terminal 53a of the DC-to-DC converter 53. The voltage control circuit 80 includes an n-channel field effect transistor (FET) 81 and resistors R6 to R8.

The resistors R6 and R7 are dividing resistors for decreasing the voltage input to the feedback terminal 53a of the DC-to-DC converter 53 to a reference voltage (0.8 V). The DC-to-DC converter 53 controls the output voltage to be decreased when the voltage input to the feedback terminal 53a is higher than the reference voltage, and controls the output voltage to be increased when the voltage is lower than the reference voltage.

The n-channel FET 81 is turned on when the output of the comparator 72 goes to High. When the n-channel FET 81 is turned on, the resistance of the dividing resistors R7 and R8 (a combined resistance of the resistor R7 and the resistor R8) decreases, and the voltage input to the feedback terminal 53a decreases. Therefore, the DC-to-DC converter 53 controls the output voltage to be increased.

When a predetermined current I flows through the USB cable 60, the voltage output from the DC-to-DC converter 53 drops by Δ V(=I×(R0+R1+Rsw)), where R0 is the resistance of the USB cable 60, and Rsw is the resistance of a resistor in the high-side switch 71. Therefore, the resistance of the resistor R8 is adjusted so that the output voltage of the DC-to-DC converter 53 rises by Δ V. Although a voltage drop due to the resistance of wiring patterns of the substrate and contact resistance of a connector to which an USB device is connected is been taken into account, it is apparent that the above-described resistances to be taken into account.

The switching circuit 90 includes a p-channel FET (a semiconductor switch) 91, a Schottky diode (a step-down element, hereinafter referred to as "diode") 92, and a high-side switch 93. The switching circuit 90 is configured to receive the output of the comparator 72. When the output of the comparator 72 goes to High, a power supply path for supplying electric power to the back USB I/F 17a switches from a power supply path on the p-channel FET 91 side to a power supply path on the diode 92 side.

The p-channel FET 91 is turned on or off according to the output of the comparator 72. The p-channel FET 91 is turned off when the output of the comparator 72 is High, and is turned on when the output of the comparator 72 is Low. The Schottky diode 92 is a diode element that passes a current only in one direction. The Schottky diode 92 has a lower forward voltage drop than general diodes. The high-side switch 93 controls ON/OFF of the V-BUS according to an instruction from the CPU 11. In addition to ON/OFF control of the V-BUS, the high-side switch 93 has the function of overcurrent protection of forcedly turning off the V-BUS when a current larger than a preset current flows.

When the output of the comparator 72 is Low, the p-channel FET 91 is turned on, so that the back USB I/F 17a is supplied with electric power via the p-channel FET 91. When the output of the comparator 72 is High, the p-channel FET 91 is turned off, so that the back USB I/F 17a is supplied with electric power via the Schottky diode 92. At that time, the Schottky diode 92 has a forward voltage drop, so that the voltage of the back USB interface 17a is decreased by an amount corresponding to the forward voltage drop from the output voltage of the DC-to-DC converter 53.

The forward voltage drop at the Schottky diode 92 changes according to the current. In particular, when no current flows, the Schottky diode 92 has no substantial voltage drop. Therefore, a current may be intentionally passed through using dummy load resistance.

Next, the operation of the voltage compensating circuit 54 shown in FIG. 4 will be described. When a USB device that needs a low current, such as the external HDD 14, is connected to the front USB I/F 21, a voltage drop occurs at resistors R0 of the USB cable 60. At that time, the voltage drop at the resistors R0 causes the comparator 72 to output High. When the output of the comparator 72 goes to High, the voltage control circuit 80 controls the output voltage of the DC-to-DC converter 53 to be increased.

Thus, even if a voltage drop occurs at the USB cable 60, the output voltage of the DC-to-DC converter 53 rises by an amount corresponding to the voltage drop, and the front USB I/F 21 is supplied with a predetermined voltage (5 V±5%).

Furthermore, when the output of the comparator 72 goes to High, the switching circuit 90 supplies electric power to the back USB I/F 17a via the Schottky diode 92. The forward voltage drop at the Schottky diode 92 decreases the boosted output voltage of the DC-to-DC converter 53.

Thus, even if the output voltage of the DC-to-DC converter 53 rises, the voltage drop in the Schottky diode 92 allows the back USB I/F 71a to be supplied with a predetermined voltage of (5 V±5%).

Thus, the front USB I/F 21 and the back USB I/F 17a are individually supplied with predetermined voltages.

Second Embodiment

Figure 5:
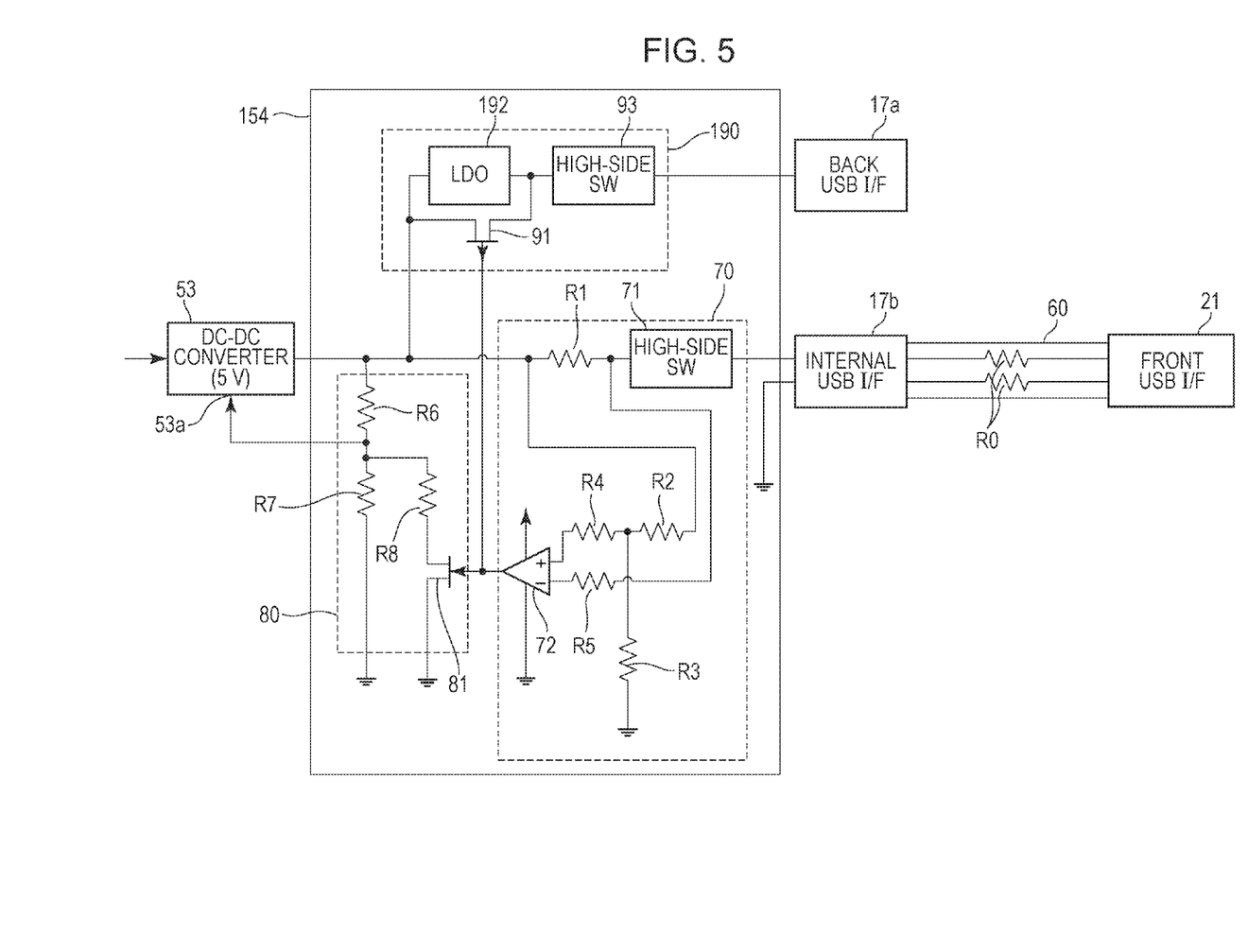
FIG. 5 is a circuit diagram illustrating a voltage compensating circuit according to a second embodiment of the present invention.

FIG. 5 is a circuit diagram illustrating a voltage compensating circuit 154 according to a second embodiment of the present invention.

Referring to FIG. 5, the voltage compensating circuit 154 according to the second embodiment of the present invention will be described.

The second embodiment uses a low drop-out (LDO) regulator (a step-down element) instead of the Schottky diode. The other components are the same as those of the first embodiment, and descriptions thereof will be omitted.

A switching circuit 190 of the second embodiment switches the voltage output to the back USB I/F 17a when the output of the comparator 72 goes to High. The switching circuit 190 includes a p-channel FET 91, a LDO regulator 192, and a high-side switch 93. The LDO regulator 192 is a constant-voltage DC-power supply element that can only decrease voltage, which is a regulator in which the difference between an input voltage and an output voltage is very small.

Other Embodiments

Although the above embodiments have been described as applied to an example including the current detection circuit 70 for detecting a current, a voltage monitoring IC may be provided to detect voltage.

Although the first embodiment includes the resistor R1 separate from the high-side switch 71, a resistor in the high-side switch 71 may be used instead of the resistor R1. Although the first embodiment allows high-accuracy current detection by using the resistor R1, the presence of the resistor R1 leads to a useless voltage drop and an increased cost. Therefore, a current may be detected using the resistor in the high-side switch 71 without using the resistor R1. The high-side switch 71 generally accommodates a FET to control ON/OFF of the V-BUS and includes an internal resistance of about 100 mΩ. Thus, a circuit configured to turn on the comparator 72 when a current, for example, from 500 mA to 1 A, flows, allows current detection without the resistor R1.

Although the above embodiments have been described as applied to an example in which the resistor R8 having a predetermined resistance is used, the resistor R8 may be a variable resistor because the amount of the voltage drop changes according to the length of the USB cable 60 and the thickness of the wire rods of the USB cable 60.

Although the above embodiments adopts USB-standard interfaces as interfaces mounted on the controller unit 10, the interfaces mounted on the controller unit 10 are not limited to the USB-standard interfaces. For example, IEEE 1394 standard interfaces may be adopted.

Although the above embodiments adopts a USB-standard interface as an interface connected to the controller unit 10 through a cable, the interface connected through the cable is not limited to the USB-standard interface. For example, an IEEE 1394 standard interface may be adopted.

Although the above embodiments have been described as applied to an example in which the present invention is applied to the image forming apparatus 1, the present invention may be applied to an information processing apparatus, such as a personal computer.

The power supply unit according to an aspect of the present invention is capable of supplying voltage within a specified range to each of a plurality of electronic devices that receive electric power generated by a power supply part.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-061689, filed Mar. 24, 2015, which is hereby incorporated by reference herein in its entirety.

What is claimed is:

1. An information processing apparatus comprising:
   a first USB interface which is able to connect a first electronic device;
   a second USB interface which is able to connect a second electronic device;
   a power supply part which supplies electric power to the first electronic device connected to the first USB interface and the second electronic device connected to the second USB interface;
   a first power line where a voltage drop element is arranged and which is for supplying electric power to the second electronic device connected to the second USB interface;
   a second power line where a switch element is arranged and which is for supplying electric power to the second electronic device connected to the second USB interface; and
   a voltage compensating circuit configured, in accordance with supplying electric power to the first electronic device connected to the first USB interface, to output a signal to increase a voltage output from the power supply part and to output a signal to switch the switch from on to off,
   wherein when the first electronic device is not connected to the first USB interface, the power supply part supplies power to the second electronic device through the second power line, and when the first electronic device is connected to the first USB interface, the power supply part supplies power to the second electronic device through the first power supply line based on a current detection.

2. The information processing apparatus according to claim 1, wherein the switch is a p-channel field effect transistor.

3. The information processing apparatus according to claim 1, wherein the voltage drop element is a Schottky diode.

4. The information processing apparatus according to claim 1, wherein the voltage drop element is a low drop-out regulator.

5. The information processing apparatus according to claim 1, wherein the first USB interface is connected to a substrate comprising the power supply part and the voltage compensating circuit through a cable.

6. The information processing apparatus according to claim 5, wherein the second USB interface is mounted on the substrate.

7. The information processing apparatus according to claim 1, wherein the voltage compensating circuit includes a current detection circuit to detect an electric current to be supplied to the first electronic device connected to the first USB interface.

8. The information processing apparatus according to claim 7,
   wherein the current detection circuit comprises:
   a resistor disposed between the power supply part and the first USB interface;
   a comparator comprising an input terminal connected to one end of the resistor and an input terminal connected to another end of the resistor; and
   a high side switch.

9. The information processing apparatus according to claim 8, wherein the voltage compensating circuit switches the switch from on to off based on the second signal output from the comparator.

10. The information processing apparatus according to claim 8, wherein the resistor comprises a resistor in the high-side switch.

11. The information processing apparatus according to claim 1, further comprising a printer configured to form an image on a sheet.

* * * * *